(12) United States Patent
Wronski

(10) Patent No.: US 7,233,257 B2
(45) Date of Patent: Jun. 19, 2007

(54) HAND-HELD WIRELESS CONTROL UNIT

(76) Inventor: Edward J. Wronski, 30 Grafton Ave., Toronto (CA) M6R 1C4

( * ) Notice: Subject to any disclaimer, the term of this patent is extended or adjusted under 35 U.S.C. 154(b) by 261 days.

(21) Appl. No.: 10/866,667

(22) Filed: Jun. 15, 2004

(65) Prior Publication Data

US 2005/0275560 A1   Dec. 15, 2005

(51) Int. Cl.
*G08C 19/00* (2006.01)
(52) U.S. Cl. ............... 340/825.72; 340/825.69; 340/825.22; 340/5.61; 340/5.64; 340/426.13; 341/176; 348/176; 348/734
(58) Field of Classification Search ......... 340/825.72, 340/825.69, 825.22; 348/176, 734; 341/176
See application file for complete search history.

(56) References Cited

U.S. PATENT DOCUMENTS 4,041,400 A * 8/1977 Watts .................... 455/353

5,637,964 A * 6/1997 Hakkarainen et al. ...... 315/295

FOREIGN PATENT DOCUMENTS

JP       09288903       * 11/1997

* cited by examiner

*Primary Examiner*—Brian Zimmerman
*Assistant Examiner*—Vernal Brown
(74) *Attorney, Agent, or Firm*—Weldon F. Green

(57) ABSTRACT

An instrument for generating a signal to activate or terminate electronic equipment from a remote location through a responsive sensor including an elongated rigid support formation with a switching device at one end and a signal emitting component mounted at the other end with the switching device and signal emitting component linked so that upon activation of the switching device a signal is generated in the direction established by the elongated support formation.

3 Claims, 2 Drawing Sheets

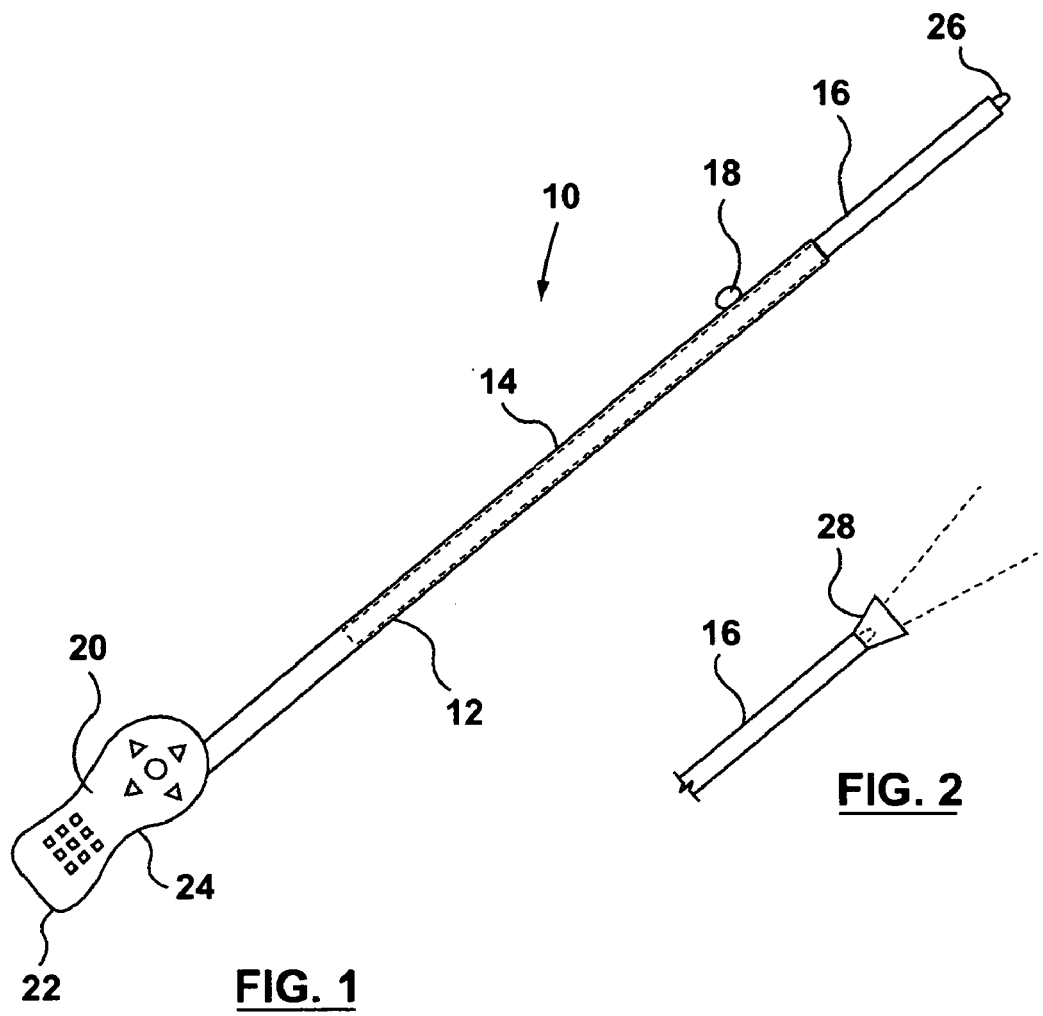
FIG. 1
FIG. 2
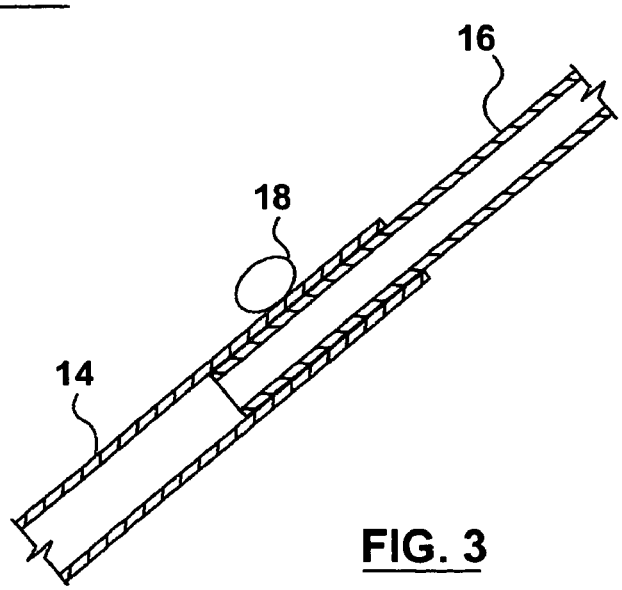
FIG. 3

HAND-HELD WIRELESS CONTROL UNIT

FIELD OF THE INVENTION

This invention relates to improvements in hand-held wireless control units for energizing and operating electronic equipment or devices and particularly to the enhancement of such control units by establishing an extended range of positions for controlling the energization and operation of same.

BACKGROUND TO THE INVENTION

Hand-held instruments for selectively energizing, by wireless remote control, one or more of several electronic units at an extended distance therefrom are needed where many such units are grouped together, for example in retail outlets for display or for demonstration of the operation of same to prospective purchasers; or to operate one or more of several units selectively as in a bank of stacked television sets, video cassette recorders, CD or DVD disk players and receivers; or in the control of separately spaced electronic equipment in any setting as in recording or broadcasting events from several camera sites at an arena, stadium, on a movie set or in a theater.

It is also desirable that a television set, for example, once energized by the improved hand-held wireless control unit at a distance therefrom can include an input device configured to control television performance and to execute game software instructions and control logic as demonstrated by U.S. Pat. No. 6,692,358.B2 issued Feb. 17, 2004.

In any arrangement of display for sale of any unit it will be desirable, if not required, to be able to energize a specific unit to the exclusion of other like units through a remote control switch to demonstrate the attributes thereof for a prospective purchaser, to be accomplished from a distance if so desired.

A disabled person in the home setting may have difficulty in approaching an electronic unit, or the sensor of such unit could be blocked by an intervening object.

It would be of great assistance and advantageous in those circumstances to have instrumentation in hand that could overcome most difficulties and improve the quality of life of the disabled person and also of the care giver.

Obviously, it will be advantageous if not satisfying, as a choice, to be able to selectively energize and operate electronic systems from a remote position as compared with known devices and arrangements.

Furthermore, in such display and in the operation of television sets, computers or other electronic instruments arranged in banks or stacked in close proximity, it will be convenient to be able to turn one of several instruments on or off, to select, reset, energize and change channels and to perform other tasks as for example enabling a DVD or other unit for viewing a program.

OBJECTS OF THE INVENTION

The principal object of this invention is to provide an instrument that incorporates a remote hand-held control unit in one location with the signal emitting component thereof arranged in separated relation thereto so that the reach of the instrument is extended by the degree of separation between the remote control unit and the signal emitting component thereof.

It is also an object to provide an instrument that has a degree of extensibility so that its reach can be conformed to a particular situation or disposition of the user and the units to be energized and controlled.

Still another object of this invention is to provide such an instrument that can selectively energize a particular electronic unit in a group or bank of such units; and operate any program associated with or incorporated into such unit.

Still another object is to provide an instrument that is lightweight and is storable so that it can be readily utilized by one and all and disposed out of sight when not required.

Another important object is to provide an instrument of which the structure is relatively inexpensive to manufacture and distribute so as to attract customer attention and acceptance.

FEATURES OF THE INVENTION

One feature of this invention resides in providing a generally linearly extending substantially rigid support formation having a location for mounting the switching device adjacent one end thereof with the signal emitting component to be mounted at the end thereof remote from said switching device with the switching device and signal emitting component so linked that upon actuation the signal is emitted in the direction established by the disposition of the support formation.

In its preferred embodiment the support formation takes form of an extended tubular structure which contributes to the lightness and maneuverability of the instrument as well as to efficiency in the manufacture or production thereof and where the switching device is wired to the signal emitting component with the tubular structures used to enclose or house the circuitry.

It is a feature also to provide the support formation in the form of nesting tubular sections so that extent of the support formation can be altered to suit a particular setting.

Still another feature of the invention resides in mounting a shield element upon the support formation to extend in a direction to block, limit or deflect signals emitted by the aforementioned component and so confine and direct the signals to a more finite region and thereby serve as a modified instrument for selection of particular electronic units to energize.

DRAWINGS

These and other objects and features will become apparent in the following description to be read in conjunction with the sheets of drawings in which FIG. 1 is a plan view of a preferred embodiment of the invention with the switching device mounted adjacent one end of an extensible tubular support formation and with the signal emitting component mounted at the other end remote from the switching device;

FIG. 2 is a plan view of a portion of a modified support formation to include a shield surrounding the signal emitting component so as to confine, block and direct the generated signals towards a selected responsive sensor or sensors or to the exclusion of others;

FIG. 3 is an enlarged cross-section of a broken away portion between the lines 3—3; of the tubular support formation shown in FIG. 1 exemplifying the nesting arrangement of tubular sections thereof for extending or retracting same;

DESCRIPTION

Figure 4:
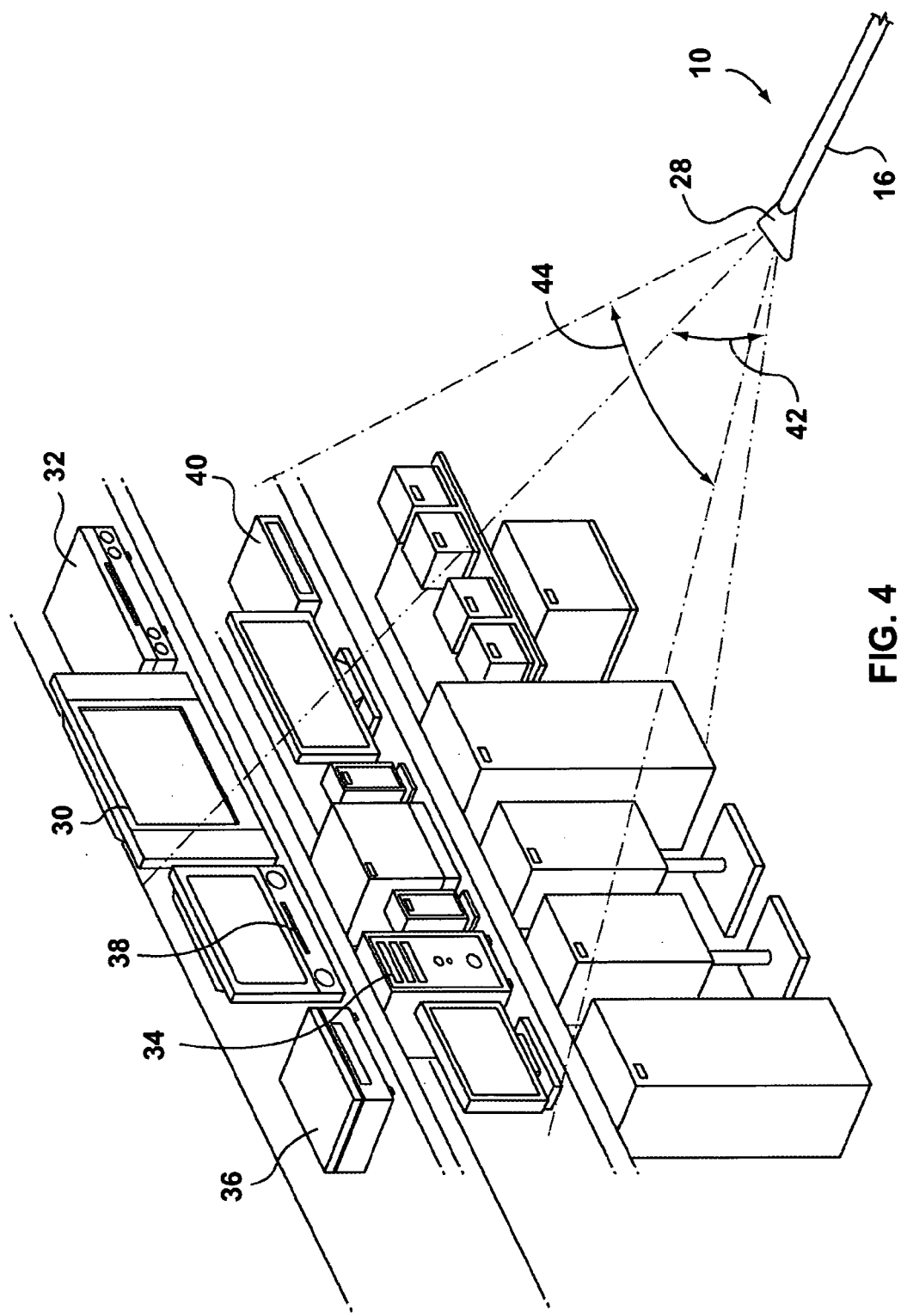
FIG. 4 is a depiction of a setting in which the preferred embodiment of the instrument shown in FIG. 2 can be introduced to effect and control the operation of one or more of the several electronic units displayed.

The instrument 10 shown in FIG. 1 is comprised of a generally linearly extending substantially rigid support formation 12 derived from two tubular segments 14 and 16, with segment 16 slidably nested within segment 14 and anchored in position by a releasable clamping element 18 in a well known manner.

A programmable switching device 20 to be selected from those currently available in the marketplace or to be later introduced is suitably mounted to the support formation 12 at one end thereof and to upstand or extend therefrom with the casing or enclosure 22 of said device 20 suitably contoured as at 24 to fit or accommodate the grip of a hand.

Mounted to project from the opposite end of tubular support formation 12 is the signal emitting component 26 of the switching device 20 which component is energized through a circuit (not illustrated) housed within the tubular support formation 12.

The signal emitting component 26 is so mounted as to line up with the direction of the support formation 12 so that the region or extent of emission is controlled by the disposition of the support formation 12, with the emission directed thereby.

A portion of the tubular segment 16 of the support formation 12 of FIG. 1 is illustrated in FIG. 2 in which the signal emitting component 26 is shown as housed or embraced within a shield element 28. The shield element 28 can be configured so as to narrow the emanation of the signals from the component and assist in confining same to a particular target, namely the responsive sensor located within or associated with an electronic unit to be energized and operated by instrument 10.

FIG. 3 shows the detail of the cross sections of the tubular sections 14 and 16 and the positioning of the clamping element 18 so that section 16 can be either extended or withdrawn to establish the selected extent of the support formation 12 in any given situation. It will be obvious that any circuitry connecting the switching device and the signal emitting component likewise if housed within the tubular section will have a sufficient extent as well as the attribute of slackness so as to accommodate the different positions that would be selected for operating the instrument.

FIG. 4 represents one setting in which the instrument 10 modified as illustrated in FIG. 2 is used to energize or deactivate the electronic equipment such as a television set 30, a set top box 32, associated with the television set, a computer 34, a VCR unit 36 or a combined television set and DVD unit 38, or a receiver 40, all provided with sensors to be triggered or energized by the selected signals to be emitted by the remote control switching device programmed in a suitable manner to generate the appropriate signals for each system.

Depending upon the configuration and disposition of the shield element 18 the emitted signals can be directed as for example through a contained angle 42 or alternatively through a contained angle 44 which by extending the support formation 12 can be closely focused on only one or several of the group or by withdrawing same to target more than one and through that sweep enable the user to energize and operate the units to his satisfaction.

It will be understood that the switching device 20 and signal emitting component 26 of the remote control unit or instrument 10 can include an input device and control logic as outlined in U.S. Pat. No. 6,692,358 B2 or other alternative structures and programs known to those skilled in this field. The instrument 10 so modified can control the operation of targeted electronic devices but at a distance therefrom to accommodate a preferred or established user location.

While the preferred embodiment of the hand-held wireless control unit has been illustrated and described persons skilled in this field may propose changes in structure without departing from the scope of the invention as defined by the appended claims.

What is claimed:

1. In a portable hand-held instrument for generating a signal to activate or terminate the operation of equipment from a remote location through a responsive sensor, a generally linearly extending substantially rigid lightweight support formation comprised of at least first and second interconnected segments with said second segment releasibly adjustably displaceable from said first segment and therebeyond over a range of selected dispositions and reversely, a switching device mounted adjacent to one end of said first segment remote from said second segment in the form of an enlarged contoured hand-gripping formation whereby said lightweight support formation is readily manipulable to orient same over said range of selected dispositions, a signal emitting component mounted adjacent the end of said second segment remote from said first segment, and means linking said switching device and said signal emitting component whereby upon activation of said switching device a signal is generated in that region established through manipulating the direction and extent of said support formation.

2. An instrument according to claim 1 wherein each segment has a generally tubular configuration with said second segment slidably nested within said first segment and a clamping element for releasibly securing said second segment in fixed relation to said first segment throughout the range of the displacement of said second segment.

3. An instrument according to claims 1 or 2 wherein said signal emitting component is so shielded as to impart a narrowed direction to the emitted signal whereby one or more out of an array of several responsive sensors may be energized.

* * * * *